(12) United States Patent
Farouk

(10) Patent No.: US 8,010,702 B2
(45) Date of Patent: Aug. 30, 2011

(54) FEATURE-BASED DEVICE DESCRIPTION AND CONTENT ANNOTATION

(75) Inventor: Alamgir Farouk, Bethesda, MD (US)

(73) Assignee: Nokia Corporation, Espoo (FI)

( * ) Notice: Subject to any disclaimer, the term of this patent is extended or adjusted under 35 U.S.C. 154(b) by 1557 days.

(21) Appl. No.: 09/881,597

(22) Filed: Jun. 14, 2001

(65) Prior Publication Data

US 2003/0009567 A1 Jan. 9, 2003

(51) Int. Cl.
*G06F 15/16* (2006.01)

(52) U.S. Cl. ........ 709/246; 709/203; 709/217; 709/223; 709/226; 715/234; 715/248

(58) Field of Classification Search .................. 709/249, 709/203, 201, 246, 219, 200, 218, 217, 226, 709/220; 715/733, 201, 210, 234, 238, 248, 715/763; 707/609
See application file for complete search history.

(56) References Cited

U.S. PATENT DOCUMENTS

| | | | |
|---|---|---|---|
| 5,572,528 A | 11/1996 | Shuen | |
| 5,717,923 A * | 2/1998 | Dedrick | 707/102 |
| 5,727,159 A * | 3/1998 | Kikinis | 709/246 |
| 5,911,776 A * | 6/1999 | Guck | 709/217 |
| 6,038,595 A | 3/2000 | Ortony | |
| 6,128,663 A * | 10/2000 | Thomas | 709/228 |
| 6,134,598 A * | 10/2000 | Raman | 709/246 |
| 6,167,253 A | 12/2000 | Farris et al. | |
| 6,167,441 A * | 12/2000 | Himmel | 709/217 |
| 6,173,316 B1 | 1/2001 | De Boor et al. | |
| 6,243,761 B1 * | 6/2001 | Mogul et al. | 709/246 |
| 6,310,601 B1 * | 10/2001 | Moore et al. | 345/660 |
| 6,342,907 B1 * | 1/2002 | Petty et al. | 715/762 |
| 6,345,293 B1 * | 2/2002 | Chaddha | 709/219 |
| 6,359,633 B1 * | 3/2002 | Balasubramaniam et al. | 345/760 |
| 6,360,249 B1 * | 3/2002 | Courts et al. | 709/203 |
| 6,412,000 B1 | 6/2002 | Riddle et al. | |
| 6,523,040 B1 * | 2/2003 | Lo et al. | 707/101 |
| 6,622,168 B1 * | 9/2003 | Datta | 709/219 |
| 6,643,650 B1 * | 11/2003 | Slaughter et al. | 709/218 |
| 6,654,814 B1 * | 11/2003 | Britton et al. | 709/246 |
| 6,658,167 B1 * | 12/2003 | Lee et al. | 382/305 |

(Continued)

OTHER PUBLICATIONS

Mayora-Ibarra, et al., "UML Modelling of Device Independent Interfaces and Services for a Home Environment Application", 2002, Mobile HCI 2002, LNCS 2411, pp. 296-301.*

(Continued)

*Primary Examiner* — Ramy M Osman
(74) *Attorney, Agent, or Firm* — Ditthavong Mori & Steiner, P.C.

(57) ABSTRACT

A system and method for providing authored content to any of a plurality of requesting user network terminal devices, the method including specifying a feature-value set for the network terminal devices, the feature-value set having a set of selected device features, each feature with one or more discrete feature values. The method further includes annotating the authored content with markup information to provide a device-independent content, associating one or more of the device feature values with the requesting user network terminal device, and converting the device-independent content into a device-specific content adapted to the requesting user network terminal device. The system includes a network terminal device detector for receiving the network terminal device request, an origin server for providing device-independent content corresponding to the request, and a transformer for associating one or more device feature values with the requesting user network terminal device in the conversion of the device-independent content.

54 Claims, 18 Drawing Sheets

U.S. PATENT DOCUMENTS

| | | | | |
|---|---|---|---|---|
| 6,701,362 | B1* | 3/2004 | Subramonian et al. | 709/224 |
| 6,772,144 | B2* | 8/2004 | Brid et al. | 715/248 |
| 6,802,058 | B2* | 10/2004 | Banavar et al. | 715/763 |
| 6,822,663 | B2* | 11/2004 | Wang et al. | 715/854 |
| 6,925,595 | B1* | 8/2005 | Whitledge et al. | 715/513 |
| 7,210,100 | B2* | 4/2007 | Berger et al. | 715/229 |
| 2002/0035568 | A1* | 3/2002 | Benthin et al. | 707/102 |
| 2002/0077823 | A1* | 6/2002 | Fox et al. | 704/260 |
| 2002/0091738 | A1* | 7/2002 | Rohrabaugh et al. | 707/517 |
| 2002/0095459 | A1* | 7/2002 | Laux et al. | 709/218 |
| 2007/0011355 | A1* | 1/2007 | Levenberg | |

OTHER PUBLICATIONS

Dragan, Richard, "iConverse Mobility Platform 3.1", Oct. 15, 2002, PC Magazine.*

Gressel, et al., "Definition and Prototyping of a Renderer-Independent ML", 2002, http://www.w3.org.*

Nance, Barry, "Building wireless apps just got easier", Jun. 25, 2001, Network World Magazine.*

Ku, et al., "Device-Independent Markup Language", Mar. 2005, IEEE Proceedings of Fourth Annual ACIS (ICIS '05).*

Rochford, Tim, "The Impact of Mobile Application Technology on Todays Workforce", Mar. 2001, iConverse Inc.*

Phanouriou, Constantinos, "UIML: A Device Independent User Interface Markup Language", Sep. 2000, Virginia Polytechnic Institute and State University Dissertation.*

Kirda, Engin, "Web Engineering Device Independent Web Services", Jul. 2001, IEEE.*

Ziegert, et al., "Device Independent Web Applications—The Author Once—Display Everywhere Approach", ICWE 2004, LNCS 3140 pp. 244-255.*

* cited by examiner

```xml
<?xml version="1.0" encoding="UTF-8"?>
<!DOCTYPE dviml PUBLIC "-//DVIML//DTD DVIML 0.1//EN"
"http://nda.nokia.com/DTD/dviml0.1xml">
<dviml version="0.10">
     Giant Deep-Sea Creature
     <area concat="true">
          <segment char="200">
          Amazes Spanish Scientists
          </segment>
          <segment char="200">
          Friday November 3 4:35 PM ET MADRID (Reuters) <br/>
          <segment>
          <segment char="50">
          Fishermen off northern Spain have captured a giant
          specimen of a strange, light-emitting, deep sea
          cephalopod, scientists said Friday.
          </segment>
          <segment char="100">
          The octopus-like creature, a taningia danae, weighs in
          at 275 pounds, measures seven feet and is easily the
          biggest of its type discovered. Disappointingly for big
          eaters near the Asturian port of Ribadesella it will not
          end up on their plates, but will be preserved and
          displayed in a marine center whose most impressive
          cephalopod to date was a mere 140 pound example.
          </segment>
     </area>
     <area concat="false">
          <segment char="50">
          picture50
          </segment>
          <segment char="200">
          picture200
          </segment>
     </area>
</dviml>
```

FIG. 4

```
<?xml version="1.0" encoding="UTF-8"?>
<!DOCTYPE wml PUBLIC "-//WAPFORUM//DTD WML 1.1//EN"
"http://www.wapforum.org/DTD/wml_1.2.xml">
<wml xmlns:nda="http://nda.nokia.com/deviceAdapter">
    <card>
      <p>
        Giant Deep-Sea Creature
        <nda:area nda:concat="true">
           <nda:segment nda:char="200">
              Amazes Spanish Scientists
           </nda:segment>
        </nda:area>
      </p>
      <p>
        <nda:area nda:concat="true">
           <nda:segment nda:char="200">
              Friday November 3 4:35 PM ET
           MADRID (Reuters) <br/>
           </nda:segment>
           <nda:segment nda:char="50">
              Fishermen off northern Spain have captured a giant
              specimen of a strange, light-emitting, deep sea
              cephalopod, scientists said Friday.
           </nda:segment>
           <nda:segment nda:char="100">
              The octopus-like creature, a taningia danae, weighs in
              at 275 pounds, measures seven feet and is easily the
              biggest of its type discovered. Disappointingly for big
              eaters near the Asturian port of Ribadesella it will not
              end up on their plates, but will be preserved and
              displayed in a marine center whose most impressive
              cephalopod to date was a mere 140 pound example.
           </nda:segment>
        </nda:area>

<nda:area nda:concat="false">
           <nda:segment nda:char="50">
              <a href="picture50"> Picture </a>
           </nda:segment>
           <nda:segment nda:char="200">
              <a href="picture200"> Picture </a>
           </nda:segment>
        </nda:area>
      </p>
    </card>

</wml>
```

FIG. 6

| FEATURES | VALUES |
|---|---|
| COLOR CAPABILITY | BOOLEAN |
| GRAPHICS | NONE, LOW, MEDIUM, HIGH |
| DISPLAY SIZE | |
| INPUT SYSTEM | KEYPAD, KEYBOARD, STYLUS |
| NETWORK BANDWIDTH | 2G, 2.5G, 3G |
| (OTHER FEATURES) | (VALUES OF FEATURE) |

| CONTENT-SPECIFIC FORMS OF FEATURE | DVML ELEMENTS | CONTENT EXAMPLE |
|---|---|---|
| X, Y | <nda:rigid> | |
| ASPECT RATIO=Y, Y | <nda:shape> | C1 C2 C3 C4 / R1 r1 r1 r1 / R2 r2 r2 r2 / R3 r3 r3 r3 / R4 r4 r4 r4 |
| COLUMNS∗CHAR WIDTH, Y | <nda:columns> | C1 C2 C3 C4 |
| X, ROWS∗CHAR HEIGHT | <nda:list> | MENU ITEM 1 / MENU ITEM 2 / MENU ITEM 3 / MENU ITEM 4 / MENU ITEM 5 / MENU ITEM 6 |
| X, CHAR COUNT÷CHAR HEIGHT / COLUMNS | <nda:area> | THE FEATURE UTILIZATION SYSTEM PROPOSED IN ROSETTA HAS TWO KEY IDEAS. THE DEVICE IS PRESENTED AS AN ABSTRACT DEVICE WHICH HAS DEVELOPER-FRIENDLY OR AUTHOR-FRIENDLY FEATURES, SHIELDING THE AUTHOR FROM BRAND-NAMES AND MINOR DIFFERENCES BETWEEN DEVICES. THE CONTENT IS CLASSIFIED INTO DIFFERENT TYPES WHICH ARE, ON THE OTHER HAND, "DEVICE-FRIENDLY". THESE TWO KEY IDEAS ARE BOTH AIMED AT MAKING IT EASIER TO DEVELOP CONTENT FOR THE MULTI DEVICE WORLD OF THE PRESENT DAY. |

FIG. 7

| CONTENT CHARACTERISTIC | RELEVANT DEVICE DISPLAY ATTRIBUTE | DVIML ELEMENT | VALUE FOR ACTUAL DEVICE | VALUE FOR GENERIC DEVICE |
|---|---|---|---|---|
| IMAGES (FIXED FORM) | X, Y | <RIGID> | ZERO TO INFINITY AND ALL INTEGERS IN BETWEEN (0 TO ∞) | SAME AS FOR THE ACTUAL DEVICE. |
| TABLES AND VECTOR GRAPHICS (GENERATED FIXED FORM) | ASPECT RATIO | <SHAPE> | ZERO TO INFINITY AND ALL NUMBERS IN BETWEEN (0 TO ∞) | SQUARE PORTRAIT LANDSCAPE |
| COLUMNS (Y-AXIS FREE FORM) | COLUMNS | <COLUMS> | ZERO TO INFINITY AND ALL INTEGERS IN BETWEEN (0 TO ∞) | 5 10 20+ |
| LISTS OR ROWS (X-AXIS FREE FORM) | ROWS | <LIST> | ZERO TO INFINITY AND ALL INTEGERS IN BETWEEN (0 TO ∞) | 5 10 20+ |
| TEXT (BI-AXIALLY FREE FORM) | CHAR COUNT | <AREA> | ZERO TO INFINITY AND ALL INTEGERS IN BETWEEN (0 TO ∞) | 50 100 200+ |

FIG. 10

| FEATURE | POLYMORPH | VALUE |
|---|---|---|
| DISPLAY SIZE | X, Y | 160, 160 |
| | ASPECT RATIO | SQUARE |
| | COLUMNS | 20 |
| | ROWS | 20 |
| | CHAR COUNT | 200+ |
| GRAPHICS | | YES |
| COLOR | | NO |
| KEYBOARD INPUT | | NO |
| SCREEN INPUT | | YES |

```
<?xml version="1.0"?>
<!DOCTYPE wml PUBLIC "-//WAPFORUM//DTD WML 1.1//EN"
"http://www.wapforum.org/DTD/wml_1.2.xml">
<wml xmlns:nda="http://nda.nokia.com/deviceAdapter">
    <card id="Forecast" newcontext="true" title="Forecast">
        <p align="center">
            <nda:shape>
                <nda:pick nda:aspect_ratio="landscape">
                    <table align="CCCCC" columns="5">
                        <tr>
                            <td>M</td>
                            <td>T</td>
                            <td>W</td>
                            <td>Th</td>
                            <td>S</td>
                        </tr>
                        <tr>
                            <td><img alt="clouds" src="../images/weather/clouds.wbmp"></img></td>
                            <td><img alt="mixed" src="../images/weather/mixed.wbmp"></img></td>
                            <td><img alt="ptcloudy" src="../images/weather/ptcloudy.wbmp"></img></td>
                            <td><img alt="rain" src="../images/weather/rain.wbmp"></img></td>
                            <td><img alt="sun" src="../images/weather/sun.wbmp"></img></td>
                        </tr>
                        <tr>
                            <td>78 F</td>
                            <td>89 F</td>
                            <td>95 F</td>
                            <td>88 F</td>
                            <td>79 F</td>
                        </tr>
                        <tr>
                            <td>68 F</td>
                            <td>69 F</td>
                            <td>75 F</td>
                            <td>68 F</td>
                            <td>65 F</td>
                        </tr>
                    </table>
```

FIG. 13A

```
                </nda:pick>
45              <nda:pick nda:aspect_ratio="portrait">
                 <table align="LCR" columns="3">
                  <tr>
                   <td>M M</td>
                   <td><img alt="clouds"
50   src="../images/weather/clouds.wbmp"></img></td>
                   <td>Hi  78 F<br></br>Lo  68 F</td>
                  </tr>
                  <tr>
                   <td>T</td>
55                 <td><img alt="mixed"
     src="../images/weather/mixed.wbmp"></img></td>
                   <td>Hi  89 F<br></br>Lo  69 F</td>
                  </tr>
                  <tr>
60                 <td>W</td>
                   <td><img alt="ptcloudy"
     src="../images/weather/ptcloudy.wbmp"></img></td>
                   <td>Hi  95 F<br></br>Lo  75 F</td>
                  </tr>
65                <tr>
                   <td>Th</td>
                   <td><img alt="rain"
     src="../images/weather/rain.wbmp"></img></td>
                   <td>Hi  88 F<br></br>Lo  68 F</td>
70                </tr>
                  <tr>
                   <td>S</td>
                   <td><img alt="sun"
     src="../images/weather/sun.wbmp"></img></td>
75                 <td>Hi  79 F<br></br>Lo  65 F</td>
                  </tr>
                 </table>
                </nda:pick>
               </nda:shape>
80            </p>
            </card>
           </wml>
```

FIG. 13B

CONSIDER AN OBJECT WHICH HAS
FOUR FEATURES.

FEATURES = α  β  χ  δ

EACH FEATURE MAY TAKE
DIFFERENT VALUES, DENOTED BY
A DIFFERENT 'FONT' HERE.

|  α  |  β  |  χ  |  δ  |
|-----|-----|-----|-----|
|  A  |  B  |  C  |  D  |
|  A  |  B  |  C  |  D  |
|  A  |  B  |  C  |  D  |
|  A  |  B  |  C  |  D  |
|  A  |  B  |  C  |  D  |
|  A  |  B  |  C  |  D  |

NEW FEATURES EXTEND THE 'SPACE'. UNTIL WE EXTEND OUR 'ALPHABET' WE DO NOT RECOGNIZE THIS SPACE.

NEW FEATURE, E → ε α β χ δ
E A B C D
ε α β c ∂
E A B C D
𝓔 𝓐 𝓑 C 𝓓
E A B C D
𝓔 𝓐 𝓑 𝓒 𝓓

FIG. 19

OLD FEATURES MAY CONVERGE TO A SINGLE VALUE, AND HENCE NO LONGER BE OF INTEREST.

CONVERGED FEATURE, D

FEATURE-BASED DEVICE DESCRIPTION AND CONTENT ANNOTATION

FIELD OF THE INVENTION

This invention relates to network communication and, in particular, to a system and method for providing authored content to user network terminal devices.

BACKGROUND OF THE INVENTION

As the Internet began to evolve, personal computers (PCs) and desktop terminals were typical terminal devices used to access the Internet. Because the configurations of PCs and desktop terminals were relatively mature, their capabilities and attributes did not vary widely from device to device. For example, these network terminal devices could be considered as having the same form factor without any loss of effectiveness of content delivery. Accordingly, content authors, or web developers, could generate content for the PCs and terminals without needing to consider different form factors. The most common display device, a PC monitor, already had an essentially standard form-factor in place before the advent of the Internet.

Thus, although the sizes and shapes of PC monitors did vary from device to device, it was not necessary for the content author to customize the content to the physical aspects of the display. When it became necessary or desirable to modify the content to accommodate a particular PC display, the modification was usually simple enough so as not to require the intervention of the content author. Such simple modifications were typically incorporated by a browser layout manager, or by some automatic mechanism on the user network terminal device itself.

On the Internet, content is usually requested by user for display on or delivery to a terminal device. Until recently, the terminal device most commonly used would be either a desktop Personal Computer (PC) or a Network Terminal or Workstation. More recently, with the development of wireless internet and handheld display devices, the concept of 'terminal device' has been extended to a much wider array of delivery devices, including for example, cellular telephones (having communication and display methods such as WAP, Imode, and HDML), PDAs (such as Palm Pilot, Psion, and Revo) with wireless or wired access to the network, and combinations of PDAs and cellular telephones. In general, 'terminal device' will be understood to mean any device which has a capability for making a request for Internet content, and has a capability of delivering the Internet content to the terminal device user. It should be pointed out that a terminal device may not necessarily include a display, as in the devices intended for use in an automobile, or for use by vision-impaired persons.

In the present state of the art, the Internet can also be accessed by other types of user network terminal devices, such as wireless data transceivers or mobile stations. While this has created new and expanding information service possibilities for the users, the content author has been presented with the challenge of providing content for new network terminal devices having diverse form factors.

With the increased use of cell phones, Personal Data Assistants (PDAs), and other types of wireless terminal devices, the content author can no longer consider the network terminal device displays to be essentially equivalent to one another. The capabilities, features, and variations in form factor among such devices are not insignificant, and ignoring these differences usually results in a decrease in the fidelity of content delivery. Moreover, the development of newer wireless terminal devices continues, with the availability of new features and applications as well as additional changes in the basic form factor.

Software developers and content authors incorporate new features or a change to an existing feature so as to fully realize the capabilities of more sophisticated user network terminal devices without overwhelming simpler terminal devices. However, as the number of different types of network terminal devices continues to grow, it becomes increasingly difficult for a content author to generate code to automatically convert the content to fit the user network terminal device, for example, as both created content and terminal devices become more numerous.

There are at least three options available to address this situation. In the first option, the content author creates content for the simplest type of network terminal device and provides this basic content to all types of terminal devices, from simplest to the most sophisticated (i.e., content is created for the lowest common denominator). The first option requires minimal input from the content author, but it precludes utilizing the capabilities available in the more sophisticated devices.

In the second option, the content author can precisely identify the capabilities of all types of network terminal devices and then generate respective content versions for each type. The second option provides the most effective utilization of the capabilities of the various user network terminal devices but requires a greater effort on part of the content author.

The second option is not practical for several reasons. For example, there are no standard methods for identifying or describing the capabilities of network terminal devices. Accordingly, a design solution developed without reference to a standard method will therefore be a custom or an individual solution which cannot be readily shared by other content developers, or even reused by the original content developer. As another example, maintaining a list of user network terminal device characteristics becomes impractical as new designs and features appear as a continuation of the ongoing development of terminal devices. Moreover, the task of generating content to precisely match the capabilities of particular user network terminal devices, known in the relevant art as 'fine-grain matching,' becomes very daunting.

In most instances, an automated process, devoid of any knowledge of the meaning of the content, is inadequate for adapting authored content to a particular user network terminal device. For example, if an authored page contains a picture, but is loaded into an 'audio-only' device, the picture cannot be 'read' and will usually be ignored. In some conventional systems, replacement 'text' may be substituted in place of the picture.

However, if the content author knew that the content might be directed to audio-only devices, he might have included in the authored content an audio file that assisted in visualizing the picture. Other examples could be provided of circumstances in which the author may have had a 'better' idea of how to modify his content, where the particular modification depends on the device type. Autonomous systems, on the other hand, will ignore such intent resulting in a system having a lower fidelity. As used in the present specification, the term 'author intent' will refer to the inclusion of the intent of the content author as a meta-data (viz., not as part of the main data but as auxiliary information).

In the third option, there is provided an autonomous system having adequate intelligence to make correct decisions in transforming the content for a particular user network terminal device. The autonomous system, when invoked, would transform 'device-independent' content into 'device-specific' content. In way of example, the automatic system may utilize the process of 'web-clipping,' where applicable software makes use of an intelligent scheme in determining how to modify content formatted for a conventional terminal device (e.g., a personal computer) into a format suitable for a wireless terminal device (e.g., a Palm PDA).

In general, there are similar situations in which the intent of the author is required when modifying the content. It is usually not possible for a system to automatically make appropriate decisions without first having knowledge of the author intent. A practical system would thus require automation as well as author's knowledge of the different devices in which the content may be displayed. The capabilities of such a system can range from a substantially automatic system to a system primarily controlled by the author or developer.

The content typically contains no author information to assist in such a modification process. Furthermore, in situations where it becomes necessary to generate supplemental content, that is, to 'fill' a larger network terminal device display with content not initially provided, the 'fill process' requires the authored content to include all the information necessary to enable an otherwise automatic system to carry out the content specialization in an effective manner. In other words, a system which takes 'hints' from the author is more practical than a fully-automatic system which utilizes no such inputs.

In the present state of the art, the content developer does not have standardized tools by which to conduct independent authoring. The content developer may make use of technologies such as Resource Description Format (RDF), to describe user preferences and wireless terminal device capabilities. RDF, an XML syntax for describing resources, is not used alone but can be used in conjunction with a Composite Capability/Preference Profile (CC/PP) or with a User Agent Profile (UAProf) to describe the features of a wireless terminal device, for example.

CC/PP uses RDF to describe device capabilities by setting up a detailed framework for such purposes. However, describing the device is accomplished in a 'developer-unfriendly' manner. For example, CC/PP documentation provides the following 'print and display' vocabularies:

charWidth:
charHeight:
charset:
pix-x:
pix-y:
color: (e.g., 'binary,' 'grey,' 'limited,' 'mapped,' 'full')

While, in theory, this information is enough to allow a content author to 'tailor' content for the network terminal device, the process is not straightforward. Absolute pixel values and character sizes are too fine-grained in comparison to the process by which content is differentiated between network terminal devices. For example, such fine-grained information may be useful in the task of calculating line breaks or page widths, but is not suitable for expressing author intent.

UAProf, developed by the WAP Forum, is similar to CC/PP by using RDF to describe the network terminal device. However, use of UAProf poses problems similar to CC/PP, as discussed above, in that the defined variables, listed below, are not appropriate for developer usage.

Model
BitsPerPixel
OutputCharSet
PointingResolution
PixelAspectRatio
NumberOfSoftKeys
ScreenSize (e.g., 160×160, 640×480)
ScreenSizeChar (e.g., 12×4, 16×8)

Such information is not useful precisely because it is presented in too great a detail.

As an alternative, Extensible Hypertext Markup Language (XHTML) @media tags allow specific stylesheets to be loaded depending on the type of media (e.g., desktop, handheld, phone, printer). The job of writing the appropriate stylesheets is still left to the developer, and this is not a trivial task by any means. Moreover, XHTML @media tags is designed more for formatting than for content differentiation based on author intent and is not typically considered for displaying author intent.

It can be appreciated by one skilled in the relevant art that, although it is possible for a developer to adapt his content to the network terminal device using either CC/PP or UAProf attributes, this method still presents a challenge to the content author. Moreover, by distinguishing between network terminal devices on the basis of features such as character size or number of soft keys, the adaptation process may become more detailed and complex than is desirable. Thus, the task has been made more difficult by requiring the content author to address features in general instead of being selective in first establishing which features are really necessary to properly display content. In short, the description of a device feature in either UAProf or CC/PP is not 'developer-friendly.'

As should be understood, these conventional methods using CC/PP and UAProf have not attained acceptance in the relevant art because of the mismatch between minimizing author effort and maximizing utilization of devices for that level of effort. It can be shown that the conventional methods are, essentially, an all-or-nothing solution, and using a conventional method requires the content author to determine how different content-types should be annotated for a given feature.

What is needed is a system and method that predictably reflect the intent of the content author when content is displayed in a network communication terminal device, even if the content requires transformation for compatibility with the network communication terminal device.

SUMMARY OF THE INVENTION

The present invention results from the observation that an abstract, generic terminal device can be defined in terms of a set of discrete values of a plurality of selected terminal device features to provide an approximate representation of any user network terminal device, and that, if a content author creates content for the generic terminal device, the created content is adaptable to any of the user network terminal devices. The disclosed method includes specifying a feature-value set for the network terminal devices, the feature-value set having a set of selected device features, each feature with one or more discrete feature values, annotating the authored content with markup information to provide a device-independent content, associating one or more of the device feature values with the requesting user network terminal device, and converting the device-independent content into a device-specific content adapted to the requesting user network terminal device. The system includes a network terminal device detector for receiving the network terminal device request, an origin server for providing device-independent content corresponding to the request, and a transformer for associating one or more device feature values with the requesting user network terminal device in the conversion of the device-independent content to device-specific content formatted for the user network terminal device.

BRIEF DESCRIPTION OF THE DRAWINGS

The invention description below refers to the accompanying drawings, of which:

FIG. 4 is an example of meta-data introduced into an HTML markup providing a news story;

FIG. 6 is an example of meta-data introduced into a WML markup providing a news story;

FIG. 7 is a table listing various features of a user terminal device display along with corresponding feature values;

FIG. 10 illustrates a mathematical mapping of display size in pixels to variations in content display;

FIG. 11 shows a profile illustrating a user terminal device assigned values for its features;

FIG. 13 an example of meta-data introduced into an HTML markup providing a weather forecast;

FIG. 19 is an illustration of the method by which feature evolution is accommodated;

FIG. 20 is an illustration of the convergence of a feature to a constant value; and, FIG. 21 is an illustration of the growth of the feature value set when feature evolution is accommodated.

DETAILED DESCRIPTION OF AN ILLUSTRATIVE EMBODIMENT

Figure 1:
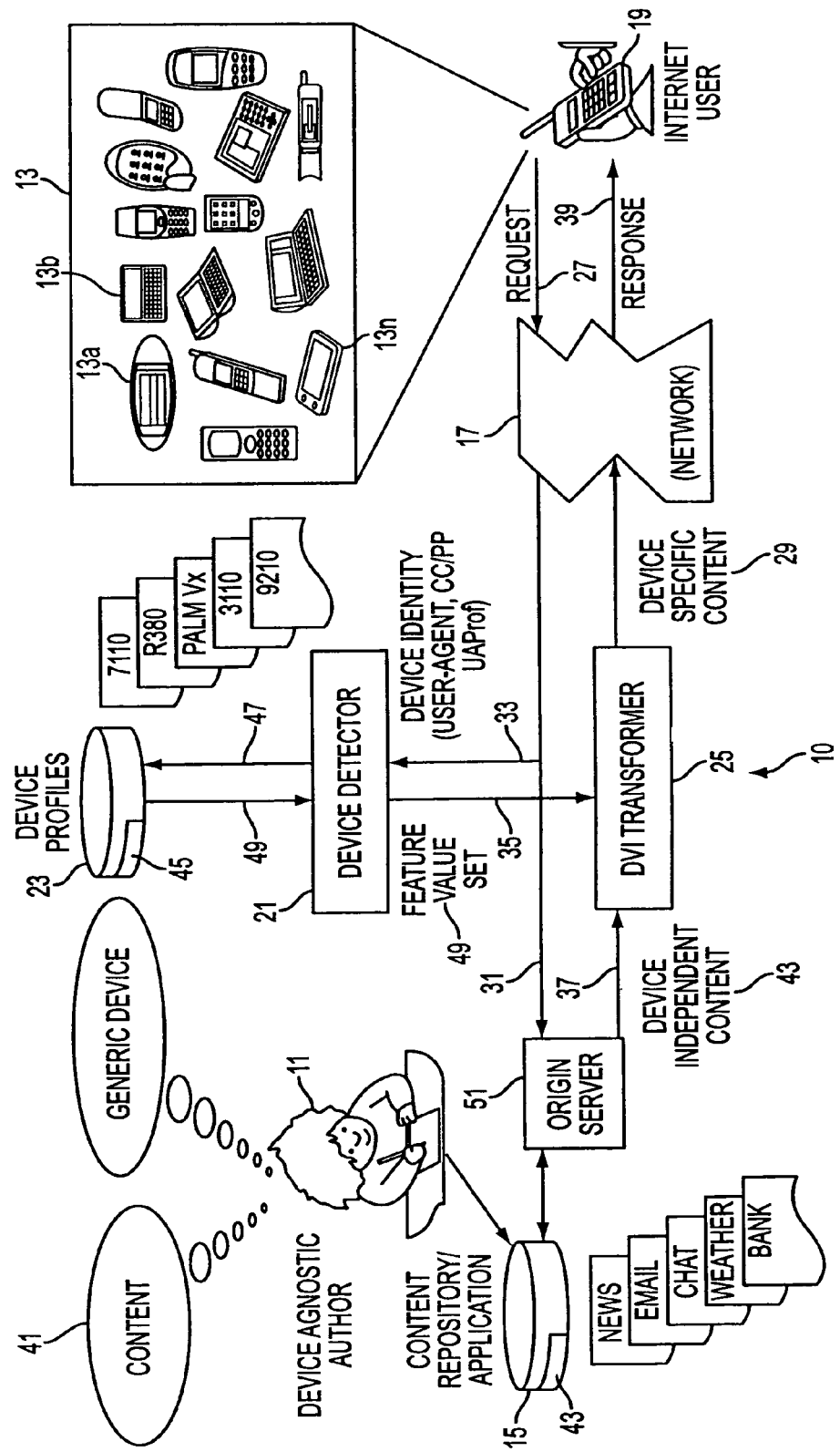
FIG. 1 is a diagrammatical representation of a network communication system in which the intent of a content author is accurately displayed on a user terminal device.

There is shown in FIG. 1 a network communication system 10 in which the intent of a content author 11, or software developer, is accurately realized when authored content 41 is displayed on a user network terminal device 19 as intended by the content author 11. The user terminal device can be any of a plurality of network terminal devices available to a user of the network communication system 10, here represented as network terminal devices 13a, 13b, . . . , 13n. A content repository 15 includes device-independent content 43 available for display in any of the network terminal devices 13a, 13b, . . . , 13n. The device-independent content 43 may include, for example, news, e-mail, weather information, and stock quotes. The device-independent content 43, which is derived from the authored content created by the content author 11, can be adapted for optimal viewing in any of the network terminal devices 13a, 13b, . . . , 13n, as described in greater detail below.

As used herein, content refers to graphic and textual content, as well as author-provided software for generating content, destined for display on the terminal device accessing the Internet, including wireless and wired internets. For clarity of illustration, wireless devices are shown in the Figures but it should be understood that the disclosed method is applicable to wired devices as well. Internet content is typically configured in the form of Hypertext Markup Language (HTML), Extensible Hypertext Markup Language (XHTML), Wireless Markup Language (WML), or some other markup language. As used herein, 'content' comprises both static content and content generated by a dynamic content generation mechanism, such as Common Gateway Interface (CGI) scripts, JAVA Servlets, Active Server Pages (ASP), Java Server Pages (JSP), or other means available in Internet servers.

The disclosed method utilizes the concept of an abstract, generic terminal device 13. The generic terminal device 13 includes a set of device features selected from the display features of the network terminal devices 13a, 13b, . . . , 13n. Each display feature selected for inclusion in the generic terminal device 13 is assigned one or more discrete values, and these discrete values are also included in the generic terminal device 13 to form a feature-value set of discrete feature values. As explained in greater detail below, if the display of the authored content 41 in the user network network terminal device 19 is dependent on the feature value of a particular user terminal device display feature, that particular display feature has preferably been included in the generic terminal device 13 as a selected feature. If the display of authored content does not depend on the value of the particular user terminal device display feature, that display feature is not included.

Because discrete values are used in the generic terminal device 13, most devices can be adequately described by using the generic device concept and selecting one of the discrete feature values from the possible feature values that most closely approximates the actual feature value. For example, graphics capability is considered to be a feature having two possible values—true, and false. Preferably, features and feature values are selected so as to facilitate their use by a content author when generating content. In other words, the generic terminal device 13 is utilized as a tool in establishing which of the network terminal device display features need to be taken into account by the content author 11 in the process of generating content for the variety of network terminal device displays. Accordingly, the content author 11 creates device-independent content in view of the display features and discrete feature values included (i.e., taken into account) in the generic terminal device 13. The task of the content author 11 is thus simplified as he does not need to take into account terminal device display features not included in the generic terminal device 13.

When creating device-independent content intended for display on any of the plurality of network terminal devices 13a, 13b, . . . , 13n, the content author 11 adds intent markup information, preferably in device-independent markup language (DVIML), overlaid on previously-authored content, as explained in greater detail below. The previously-authored content may also include conventional markup information, such as can be provided using wireless markup language (WML). In contrast to WML, which is used to provide conventional markup information, DVIML is used to express author intent as to how the content should be particularly transformed, where the particular transformation is a function of the characteristics of the user terminal device.

With the ongoing evolution of user network terminal devices, there are a multitude of form-factors, modes and network characteristics present where any particular network terminal device can include any combination of these variables. In order to optimally utilize the attributes of these different types of network terminal devices, it is necessary for content to be transformed (e.g. truncated, filtered or modified in some manner). The content is transformed so that the user network terminal device is not over-whelmed (which may lead to web clipping as a solution) and not under-utilized (which would leave un-utilized space or other resources).

Depending on the type of authored content 41 or its meaning to the human reader, it is possible in many cases for an automated system to carry out this transformation autonomously, based upon the characteristics of the network terminal device only, without loss of fidelity. However, there are also many examples of authored content where such an autonomous transformation is prone to destroy content fidelity because the autonomous system is unaware of the 'meaning' of the content. In such cases, author intent is required as an input so that the transformation system may defer decision-making to the author via author intent as embedded in the authored content.

DVIML is a markup language that can be utilized, in conjunction with the DVI transformer 25, to take into account both the characteristics of the identified user network terminal device 19 as well as the author intent to transform the authored content 41 into a device-specific form which utilizes the features of a device optimally. Incorporation of author intent, expressed via DVIML, assures a greater fidelity to the original intentions of the content author 11. DVIML is defined by using the XML (Extensible Markup Language) authorized by the W3C (World Wide Web Consortium). Since the contents of DVIML data are marked up by tags (e.g., <title>, <shape>, <area>), a user of the DVIML markup can understand the data easily, and a computer can process and search the data quickly, making DVIML both human-readable and machine-parsable.

Figure 2:
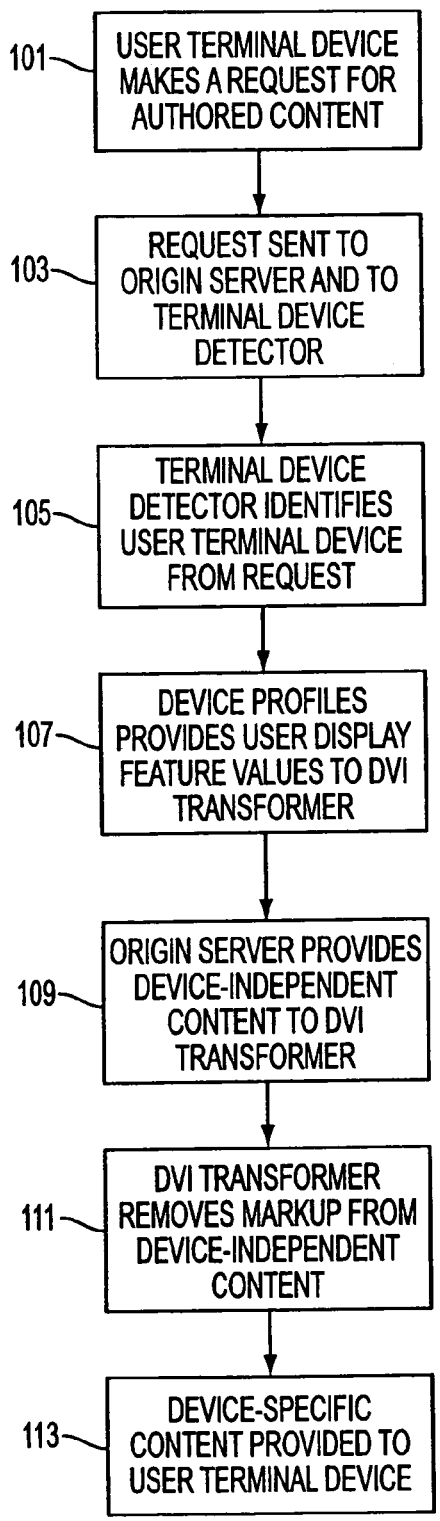
FIG. 2 is a flow diagram illustrating operation of the network communication system of FIG. 1.

The disclosed method can be best explained with reference to the flowchart of FIG. 2 in which the user network terminal device 19 makes a request 27 for the authored content 41, at step 101. The request 27 is transmitted along a path 31 to an origin server 51 and, contemporaneously, along a path 33 to a terminal device detector 21, at step 103. Preferably, the selected features of the user network terminal device 19 have been previously included in the generic terminal device 13, and a user device terminal features profile 45, corresponding to the user network terminal device 19, is resident in a device profiles repository 23, as explained in greater detail below.

Accordingly, when the request 27 is received at the terminal device detector 21, the terminal device detector 21 ascertains the identity of the user network terminal device 19 from the header, or network terminal device information, contained in the request 27 and provides an identification 47 to the device profiles repository 23, at step 105. The device profiles repository 23 responds by using the identification 47 to select the user terminal device features profile 45 and to provide a user display feature-values set 49 that presents the closest match to the identified user network terminal device 19. The process of determining features and feature values from the feature-value set are described in greater detail below. The user display feature-values set 49 is then provided to a device-independent (DVI) transformer 25 along a path 35, at step 107.

The device-independent content 43 produced by the content author from the authored content 41 is retrieved from the content repository 15 by the origin server 51. The origin server 51 provides the device-independent content 43 to the DVI transformer 25 along a path 37, at step 109. At this stage, the device-independent content 43 comprises annotated authored content that includes DVIML markup information and may also include other markup information, such as WML markup information.

The DVI transformer 25 utilizes the user display feature-values set 49 obtained from the device profiles repository 23 along with the DVIML 'author-intent' markup to transform the device-independent authored content 43 into device-specific authored content 29 adapted for the requesting user network terminal device 19, at step 111. The device-specific authored content 29 may retain WML or other markup information found in the device-independent authored content 43. However, the DVIML markup is not needed once the user network terminal device 19 has been identified and the related feature values have been determined. Accordingly, the DVI transformer 25 removes the DVIML markup from the annotated authored content, The device-specific authored content 29 is provided to the user network terminal device 19 along a path 39, at step 113.

Feature-Value Set

The disclosed method includes the process of first describing a particular network terminal device in terms of selected device features. As used in the present disclosure, the term 'selected device feature' refers to a network terminal device attribute which affects the way in which the delivery of authored content or of user interaction is presented, and which provides information for a specific purpose. Device features meeting one or both of these preestablished criteria are then included in the generic terminal device 13. For example, while the color of a network terminal device is a feature, the device color is not relevant to the display of the authored content and is not, therefore, selected to be included in the generic terminal device 13. Thus, selected features are those features which require little or no additional processing by the content developer when the selected features are used to generate the device-independent content.

Examples of selected device features are the display size, aspect ratio, the display line count, and the color capability of the network terminal device. Each of the selected device features is assigned one or more discrete values. The display aspect ratio, for example, may have discrete values of 'square,' 'portrait,' or 'landscape.' The display line count may have discrete values of 5, 10, or 20. The color capability of the terminal device may have discrete values of 'monochrome,' 'color,' or 'grayscale.'

Supplemental device features may be also be selected, such as the graphics capability, variable size text capability, different font capability, and the input capability of the network terminal device, and the network bandwidth may be taken into consideration. The values assigned to such supplemental device features typically include 'yes,' 'no,' and 'default.' The set of supplemental features along with corresponding discrete values are also included in the feature-value set.

Author Intent

No single process for adapting content to a device is applicable in all cases. By way of example, consider the case of text layout when the display screen size varies with network terminal devices. In some applications, the server or browser can perform an automatic transformation, such as when text layout on a display screen requires line breaks to be inserted at appropriate places so that the screen is filled up without any cropping or overflows. Such transformations are referred to in the relevant art as 'autonomous transformations' and do not require author participation. This process depends on computations, and does not depend on the 'meaning' of the content. The 'meaning of the content' is a concept understood by the content author 11 but not by a computing device.

On the other hand, there are some types of adaptation which require hints or instructions from the content author 11, or from someone who understands the meaning of the content. For example, a news article containing hundreds of words of text must be edited if it is to fit into the small display and memory of a wireless phone or PDA. Such editing cannot be done automatically because the software is not sophisticated enough to understand the content and to decide what text should be kept and which text should be discarded. It is left to a person to make this decision by reading and understanding the content to determine the author intent.

Obviously, the person most qualified to state author intent is the content author 11. For example, the content author 11 may wish to specify which parts of the news article should be retained for a small display, for a medium display, and for a large display. The content author 11 accomplishes this by using some form of meta-data in the associated mark-up language, preferably using DVIML as described in greater detail below.

Author intent, expressed as a form of markup in the content, thus provides instructional 'hints' whereby processing software can adapt the authored content 41 depending upon the device features of a particular user terminal device. This is accomplished in two steps. In the first step, a particular device feature is selected from all the device features of a network terminal device as a feature of interest, and the variation of this feature is determined. For example, the physical dimensions of the display screen (i.e., width and height) could be selected as features. If these device feature values are simply measured and tallied, the results will be a continuous range of values, since these values are a function of the range of manufacturers' screen designs. In the disclosed method, the process of selecting device display features and assigning discrete values to the features is intended to facilitate the objective of maximum capability utilization in the network terminal device with minimum effort expended by the content author.

Some device display features can be considered to have constant value. An example is the brightness of the display. When the brightness does vary, it does not require adaptation of the authored content to utilize this variation. Thus, in the generic terminal device 13, the brightness feature is considered to have a constant value, and is therefore not a selected feature. By carefully selecting features to be included in the generic device, an entire device space may be defined, where the term 'space' is used as in mathematical set theory. Each possible combination of values of the mutually exclusive features thus represents a member of a set. Further, these features are specified to vary in discrete quantities, thus resulting in a few discrete values rather than producing a continuous range of values, as described above. The generic terminal device 13, with its discrete feature values, becomes the target device for content authors.

Method of Embedding Meta-Data

The disclosed method utilizes meta-data embedded into the authored content 41 when the content is developed. The meta-data thus embedded matches the generic terminal device and conveys the intent of the content author 11. Moreover, there is accommodation for evolution of the network terminal devices 13*a*, 13*b*, . . . , 13*n*.

Figure 3:
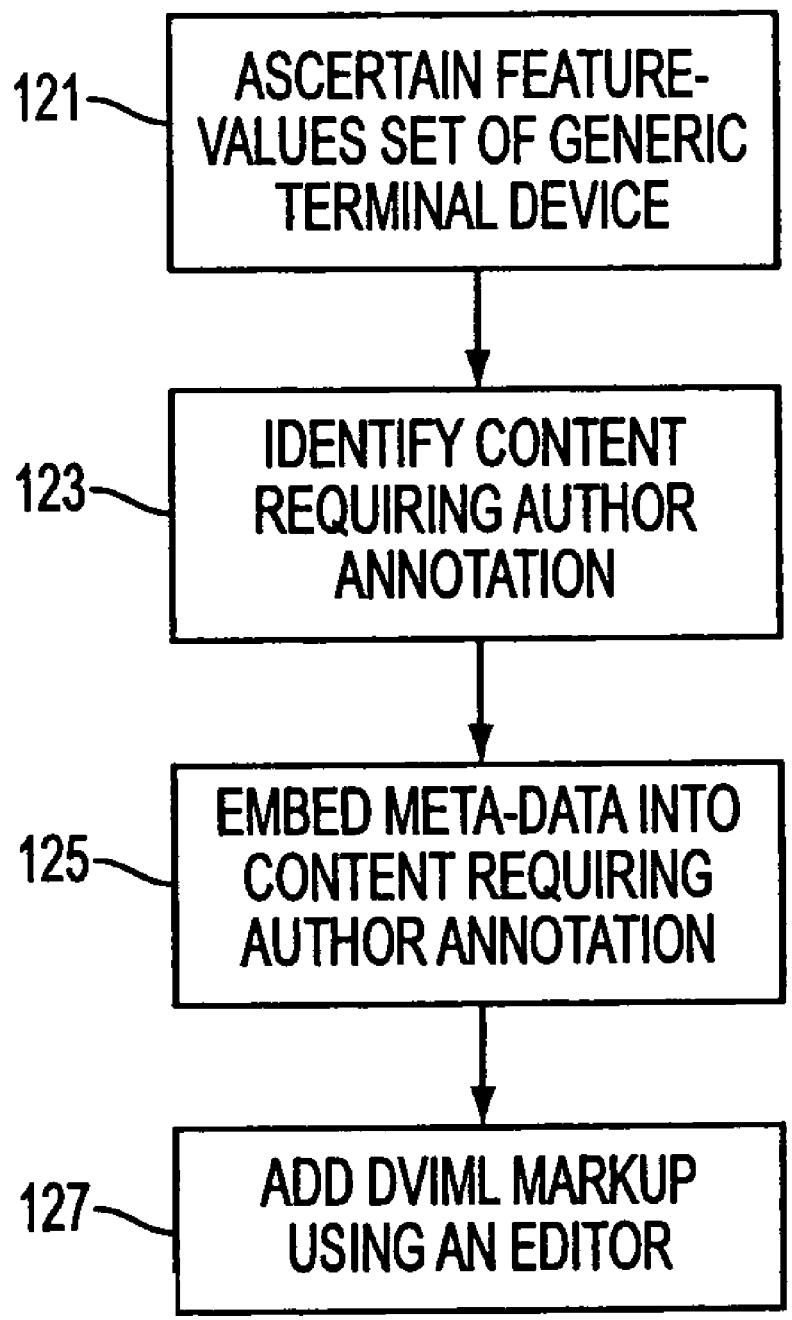
FIG. 3 is a flow diagram illustrating the process followed by the content author in producing the device-independent content of FIG. 1.

The process followed by the content author 11 in producing the device-independent content 43 is shown in the flow diagram of FIG. 3. The content author 11 first ascertains, or obtains, the value set of the generic terminal device 13, in step 121. The value set includes the features of the generic terminal device 13 and the various discrete values that can be assigned to a particular feature. Accordingly, the content author 11 does not need to consider the features of all possible network terminal devices 13*a*, 13*b*, . . . , 13*n* commercially available, but needs to consider only the features-value set 49 of the generic terminal device 13. As can be appreciated by one skilled in the relevant art, the features included in the feature-value set 49 are mutually exclusive, in that the features have no dependence on each other, and interactions between features do not have to be considered in the process of embedding meta-data. A graphics capability feature, for example, is mutually exclusive from a display size feature.

Authored content 41 which may require author intervention when being transformed by the DVI transformer 25 is identified, in step 123. By identifying and addressing only that authored content 41 which requires author annotation, the content author 11 saves the expenditure of unnecessary effort for which there would be no significant benefit realized in the process. By way of example, if the authored content 41 is of sufficiently small extent that it can be displayed in all the network terminal devices 13*a*, 13*b*, . . . , 13*n* in unmodified form, author intervention would not be required. Or, if the authored content 41 can be modified automatically, with the addition of line breaks or scroll bars when the browser shape is changed, for example, author intervention is also not needed.

For authored content 41 in which the content author 11 needs to provide information for the modification of content, DVIML is used to embed meta-data in the authored content 41, in step 125, where the meta-data is based on the feature value set. For example, in an application in which the browser shape is changed, the content author 11 may wish to change to a different graphics file so as to display an image which is more closely formatted to the geometry of the browser. In such a case, embedding DVIML markup in two or more graphics files will direct the DVI transformer 25 in accordance with the preferences of the content author 11.

After the meta-data has been embedded, DVIML markup is added to produce the device-independent content 43, at step 127. The markup may be added by using a text editor, or a specialized editor such as word-processor software. Because DVIML is based on XML, an XML editor tool can also be used for adding markup. If the authored content 41 was provided in a plain text format, then a 'stand-alone' mode of DVIML can be used. In the stand-alone mode, a full overhead of XML prologue and a root element is added, in accordance with the common practices for a conventional XML document.

For authored content 41 provided in a conventional markup format, such as WML or XHTML, for example, DVIML is used in an 'import' mode. In the import mode, the original document-type definition (DTD) is augmented to import the DVIML element declarations, if validation of the authored content 41 is required. The authored content 41 itself will then have DVIML overlaid on the existing underlying markup. Additionally, a DVIML namespace 'nda' is declared to assure that there is no conflict between the overlaid DVIML and the element and attribute names in the underlying markup (e.g., WML, XHTML). Each DVIML element name is prefixed with a namespace qualifier. As appreciated by one skilled in the relevant art, the use of namespace qualifiers and importing elements are both standardized concepts in XML.

Operation of DVI Transformer

An example of meta-data embedded in HTML markup code is provided in FIG. 4. The meta-data is shown in bold text, such as in lines 9, 10, 12, and 13, for example. As this markup and code is passed through the DVI transformer 25, the meta-data in lines 9, 10, 12, and 13 is removed without intervention by the content author 11. This process includes 'defaults' if a new or an unrecognizable network terminal device 13a, 13b, . . . , 13n requests the authored content 41. The origin server 51 or the content-author 11 can also invoke 'default device' values, and thereby over-ride actual network terminal device features values by using special activation headers. The special activation headers provide a method of 'graceful degradation' functionality if problems arise during operation of the DVI transformer 25.

Figure 5:
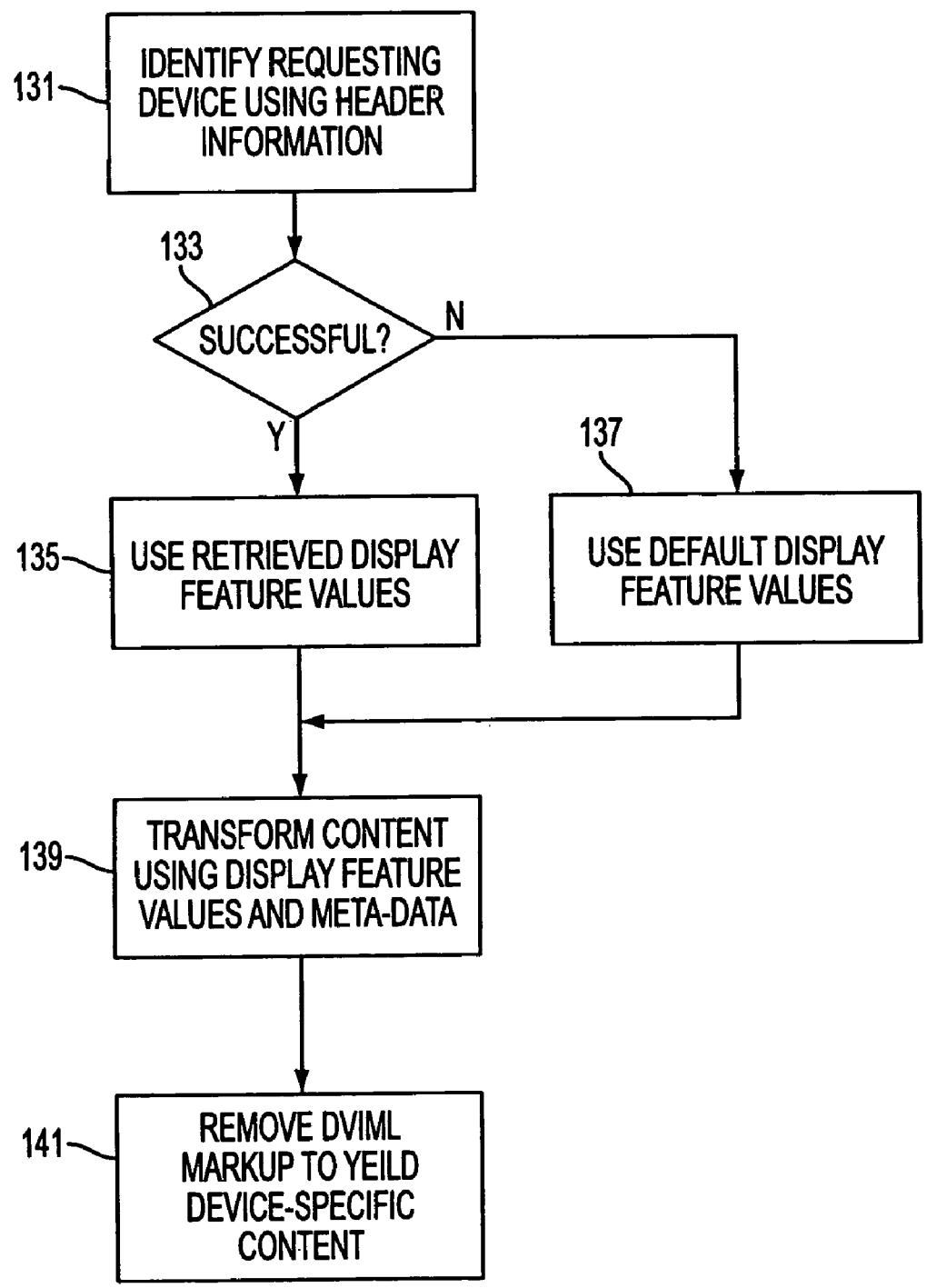
FIG. 5 is a flow diagram illustrating the identification of a requesting user terminal device.

Operation of the DVI transformer 25 is initiated with receipt at the terminal device detector 21 of the request 27 from the user network terminal device 19, in FIG. 1. As noted above, the request 27 may be provided over a wired or wireless network connection. The terminal device detector 21 responds by identifying the user network terminal device 19 from which the request 27 originated, and providing the corresponding identification 47 to the device profiles repository 23. This is preferably accomplished using the conventional UserAgent header if the request 27 is an HTML request, at step 131, in FIG. 5. Alternatively, other mechanisms such as UAProf or CC/PP can be used if the request 27 is provided using another protocol. For example, FIG. 6 shows the above meta-data as can be embedded in WML markup code. The terminal device detector 21 includes and maintains a list of known network terminal devices 13a, 13b, . . . , 13n to provide the identification capability.

Additionally, the terminal device detector 21 includes a mapping algorithm which attempts a 'best-effort' match of the requesting user network terminal device 19 to one of the known network terminal devices 13a, 13b, . . . , 13n. As used herein, 'best-effort matching' means that if the exact device is not found in the list of known devices in the device profiles repository 23, then an alternate device present in the list will be chosen instead. For example, if the actual device sought, a Nokia 7190, is not in the list, then a best-effort match may be a Nokia 7110, which is similar to the Nokia 7190. If the identification effort is completely unsuccessful, at decision block 133, a 'default' device is provided as the identification 47, at step 137, and operation proceeds to step 139. The feature values for the default device are 'default' feature values, where the default feature values are 'lowest common denominator' values, selected such that content adapted to the default device in accordance with the default feature values can be displayed on the user network terminal device 19 without loss of content. Otherwise, the nearest values of the features for a matched device are retrieved from the device profiles repository 23 as the user terminal device features profile 45 and provided to the DVI transformer 25, at step 135. The request 27 is also received at the origin server 51 which responds by providing the device independent content 43, obtained from the content repository 15, to the DVI transformer 25. The device-independent content 43 is placed in a response object, defined in HTML, and transmitted to the DVI transformer 25 by the origin server 51.

The DVI transformer 25 also receives the user device feature-values set 49 from the device profiles repository 23 via the device detector 21 for this particular response. The device-independent content 43 is then transformed into the device-specific content 29 using both the user device feature-values set 49 and the embedded DVIML meta-data, if any, at step 139. Finally, the DVI transformer also removes all DVIML markup, at step 141. If the requesting user network terminal device 19 has not been identified, a default feature-values set is used, but the device-specific content 29 is still rendered DVIML-free. If the original content is in some extended form of XML, then DVIML can be used to mark-up such content. If the original content is not XML (such as, a plain text file), then DVIML can still be used to mark-up such content as long as it contains only textual data or URL to non-text data.

Preferably, the file extension suffix of DVIML files comprises .dviml or .dvm. These suffixes are used to indicate whether the respective file is a DVIML file. DVIML can be used in conjunction with WML, or XHTML, or some other extension of XML. In such cases, the file extension .dviml or .dvm is appended to the existing extension. Thus, when a WML file, test.wml, is overlaid with DVIML markup, the file extension becomes test.wml.dviml. MIME (Multipurpose Internet Mail Extensions) Media Type of DVIML files is application/x-dviml. For combined data types, the form is preferably either application/x-dviwml or application/x-wml.dviml.

Document Type Declaration

According to one variation of the invention, the XML declaration of DVIML data is as follows:

```
<?xml version="1.0" encoding="xxx"?>
<!DOCTYPE dviml SYSTEM "http://nda.nokia.com/001/dviml.dtd">
```

The value of the attribute 'encoding' (i.e., xxx in the above description) is subject to the XML specification. Possible encoding types depend on each DVIML system.

The DVIML can be defined by using XML. Disclosed herein is a DVIML-specific specification. The element, the outline, basic and simple examples, the attribute, and the content are explained below. In order to prescribe the values of each attribute and content, the Extended Backus-Naur Form is utilized. As can be appreciated by one skilled in the art, the notation 'DVIML' represents the language specification, and the notation 'dviml' represents the root element of the DVIML when DVIML is used as in a standalone manner, without any underlying markup. When DVIML is overlaid on existing markup, then the root element of that markup remains, and no 'dviml' root element is introduced. In addition, the data described subject to the DVIML specification is denoted as 'DVIML data', and the file containing DVIML data is denoted as a 'DVIML file.'

DVIML Elements

The dviml element is the root element of the DVIML and can be described. The dviml element shows that the data is a DVIML data. For example,

```
<dviml version="0.10">
    <area>
        <segment> ... </segment>
</dviml>
```

The dviml element has an attribute of version. The version attribute specifies the DVIML version and can take values [0-9], for example. The default value for version is the latest version of the DVIML.

When DVIML is used as an overlay on another mark-up, the root element <dviml> is absent. In the disclosed method, a name-space attribute, nda is defined via a URL. In this case, the URL is used to indicate the version of DVIML in use. The dviml element has the following child elements:

<rigid>, <shape>, <list>, <columns>, and <area>, as defined below, and which are preferably described in the order shown above. The <area> and <list> elements do not need to be described, or can be described once. The <rigid> element contains content which is 'rigid' and not ordinarily modifiable by browsers. The content may not be actual content but can be the resource pointed to by a URL. Thus an image URL can be contained in a <rigid> element.

As discussed above, any user terminal device can be described by providing a list of the device attributes. For example, most terminal devices have size, weight, color, an input mechanism, and a scroll mechanism. From the perspective of a content author or a user, only some attributes are germane to the development task and attributes such as weight, case, or color are irrelevant.

In general, a feature is an attribute of a terminal device that is, preferably, mutually exclusive from other features of the device, with respect to content delivery and rendition by that device. It should be understood that non-mutually exclusive features, that is, features sharing some characteristics with other features, can also be included in the set of selected device features. A device features set having only mutually-exclusive features will comprise a set of minimum size. Not all attributes of a device are considered as a feature. Features can be single attributes, such as the display size of the device, or combinations of physical attributes. Such a combination is exemplified by an 'input-mechanism,' for example, which may comprise software for character recognition, a touch-sensitive screen, and a stylus.

To qualify as a feature, the attribute should serve a unit function in either the acquisition and delivery of content or interaction with the user. In addition, features should be mutually exclusive with respect to content delivery or user interaction and possible values. For example, the color capability and size of a terminal device are mutually exclusive with respect to how content rendition is affected, and these values can change independently. Physical or practical constraints may limit possible combinations of values. An attribute qualifies as a feature if its values can be independently changed. Examples of features include the display-size of the terminal device, color capability, network bandwidth, and input mechanism. Each feature of the generic device 13 can take on various values resulting in a representation of a terminal device which is an approximation of various physical user terminal devices.

Feature Display Size and DVIML

Table 150 in FIG. 7 lists various features 151 of the display of the user network terminal device 19 along with corresponding values 153. The most significant feature of the network terminal device 19 is typically display size 155. Display size is most conveniently represented as an array (X, Y) of pixels, shown in FIG. 8, where X is the number of horizontal pixels in a display 181 and Y is the number of vertical pixels. As can be appreciated by one skilled in the relevant art, a hardware-oriented feature of a device, such as the number of its horizontal pixels (A), can be directly translated to the author-oriented measure of columns and, likewise, the number of vertical pixels (Y) can be translatable to rows. The use of a default font and font size is assumed, and presumed to be the same for all user terminal devices. This is an approximation and is justified to maintain simplicity of the system. As the content author 11 expresses intent in rows and columns, the present device and method transforms these intentions to pixels for display on the device.

A feature-value set which included all display sizes of all available physical terminal display devices would include a relatively large number of values. As a consequence, the task facing the content author 11 coding for such a value set would be tedious and overwhelming. Instead, the feature-based device description method of the present invention specifies a greatly-reduced number of discrete display sizes for which the content author 11 would be required to create content.

Table 160 in FIG. 7 lists five content-specific characteristics 161 that determine how the authored content 41 can be displayed, along with corresponding DVIML elements 163 and content examples 165. Certain content is not capable of manipulation, exemplified by a WBMP image 171. As can be appreciated by one skilled in the relevant art, the WBMP image 171 either will, or will not, fit into a particular device display. The most accommodating format is that of a stream of text characters, exemplified by free-form text 179, which can be easily 'wrapped' in the display by the browser software with little or no loss of information. In between these feature forms are content such as tables 173, columns 175, and lists 177 whose characteristics are amenable to intelligent manipulation.

Figure 8:
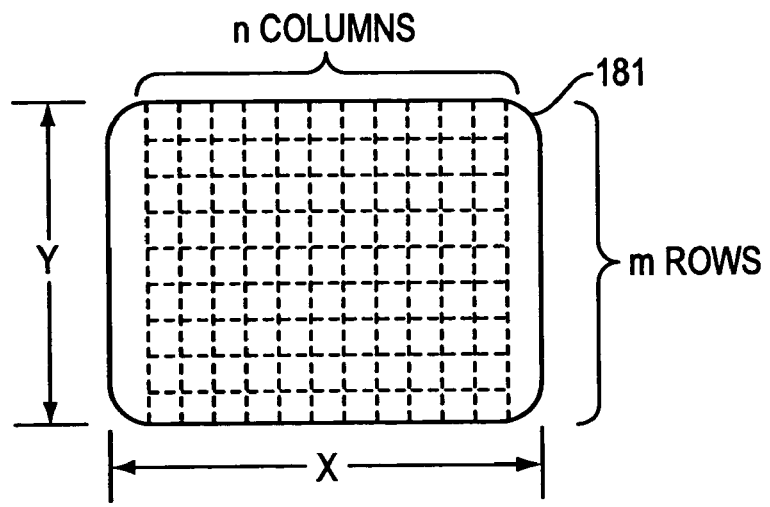
FIG. 8 is an illustration of a display comprised of a number of horizontal pixels and a number of vertical pixels.
Figure 9:
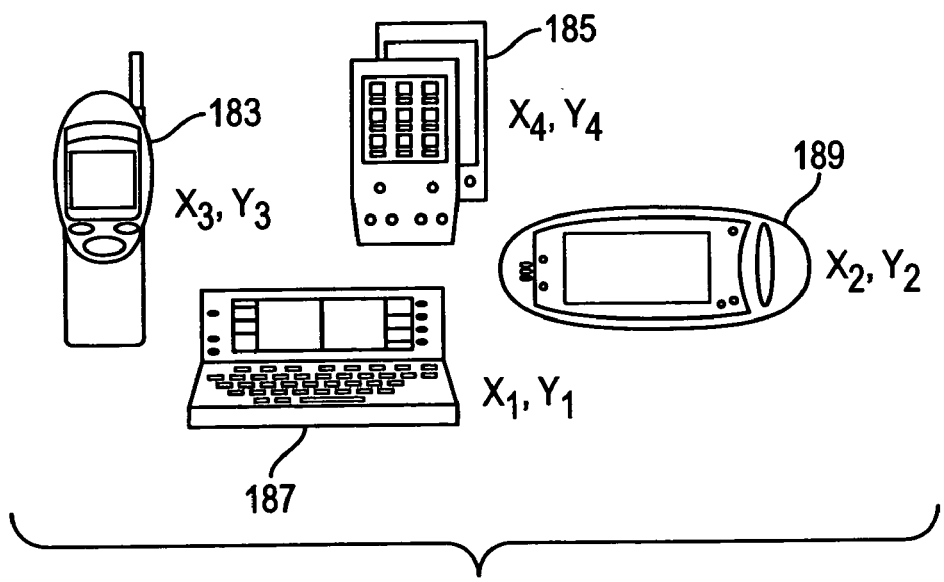
FIG. 9 illustrates how a device feature display size can be represented by the number of available pixels along the x- and y-axes of the device display.

FIG. 8 illustrates how the size a device display 181 is universally represented by the number of available pixels along the x- and y-axes of the device display. In portrait displays, such as exemplified in terminal devices 183 and 185, in FIG. 9, the value of X is smaller than the value of Y. Similarly, in landscape displays, such as exemplified by terminal devices 187 and 189, the value of X is larger than the value of Y.

Table 191, in FIG. 10, shows the mathematical mapping of display size in pixels to the variations in content display based on the substitution of the content characteristics (DVIML elements described below) in the X-Y representation of the display. The possible values of features can be discretized from the actual variation possible for that feature. This discretization reduces the degree of variation that the content author 11 has to deal with, but at the same time renders the matching process as approximate rather than as exact. This approximation is justifiable for the resulting simplicity presented to the content author 11. Table 193, in FIG. 11, shows a profile illustrating how a user terminal device is assigned 'values' for its 'features.' A plurality of such profiles is used, one profile for each type of user terminal device recognized by the network communication system 10.

Rigid Content and DVIML Element <Rigid>

Graphic images have a fixed-form content characteristic. That is, graphic images cannot be manipulated without risk of losing meaning or coherence. The content-specific characteristics 161 (in FIG. 7) indicate that graphic image content is usually represented in the fixed form (X, Y), that is in pixel format. The DVIML elements 163 indicates that the content author 11 can mark up graphic image content using the <rigid> element. Three differently-sized images, small, medium, and large, are shown in the content examples 165. The content author 11 specifies a <pick> element for each image, and the corresponding element takes a value specifying the actual pixel count of the image along the x and y axes. The disclosed method, knowing the number of pixels available on each device display, selects the appropriately-sized image for each user network terminal device 19. For example, if one <pick> element specifies attributes of (200, 200), while another <pick> element specifies (300, 300), then the network communication system 10 chooses an image having no more than a 300×300 pixel size for devices whose display uses at least 200×200 pixels but less than 300×300, and an image having an image of at least 300×300 pixels for devices which can display more than 300×300 pixels. Otherwise, the image is suppressed.

Generated Content and DVIML Element <Shape>

Tables and vector graphics have a generated-fixed-form content characteristic. That is, tables and vector graphics can be manipulated by the network terminal device 19 browser to a limited extent, but can be better manipulated at the point of generation by a server before being sent to the user network terminal device 19. The content-specific characteristics 161 indicates table and vector graphic content as being represented in the form of an aspect ratio. That is, an aspect ratio of X/Y, or the number of x-axis pixels divided by the number of y-axis pixels. The DVIML elements 163 shows that the content author 11 marks up table and vector graphics content using the <shape> element. The content examples 165 shows a single table generated in two different formats. One format is suitable for a landscape-shaped display, and the other format is suitable for a portrait-shaped display.

The content author 11 can generate different copies of the content, where each is destined for a user terminal device having a particular aspect-ratio value. The content author 11 then marks up this content using the <shape> element, within which one or more <pick> elements are specified. Each <pick> element accepts an aspect ratio attribute whose value can either be square, portrait, or landscape. The network communication system 10 then sends content marked with the square attribute to devices whose displays are defined as square in the device configuration file. Similarly, the network communication system 10 sends content tagged as 'portrait' to portrait-shaped display devices; and content tagged as 'landscape' to terminal devices having a landscape-shaped display.

List Type Content and DVIML Element <List>

Content that fits all displays along one axis and hence is not of concern along that axis has the uni-axis free form content characteristic. For lists, content along the x-axis is typically not of concern. To be more specific, although a browser may modify content along the x-axis, such modification is deemed unnecessary since it is assumed that content along the x-axis never exceeds display capability of the user network terminal device 19. By way of example, a uni-axis free form content, free along the x-axis, is a list of names taken from a telephone address book. As the DVIML elements 163 shows, the content author 11 may use the <list> element in order to specify alternatives to provide for devices which are vertically restricted. To do this, the content author 11 specifies a <list> element, and within it one or more <segment> elements, each specifying a value which is the number of supported rows, that is, the number of rows concatenated to produce a display. In processing such marked-up content, the system will pick the particular <segment> most suited for the requesting user device. As with <columns>, below, concatenation of segments is supported. The semantics for <segment> is slightly different from that for <pick>, as it is possible to specify the concatenation of <segment>. This eliminates the need to repeat in the second segment, for example, information already specified in the first segment (assuming that the first segment is more restricted than the second segment).

Columnar Content and DVIML Element <Columns>

Content that fits all displays along one axis and hence is not of concern along that axis has the uni-axis free form content characteristic. For columns, content along the y-axis is not of concern. Although a browser may modify content along the y-axis, such modification is deemed unnecessary since it is assumed that content along the y-axis does not exceed the display capability of the user network terminal device 19. An example of uni-axis free form content, free along the y-axis, is a line of text that cannot be broken, or a horizontal table with only one row. In each case, the columnar content will fit all displays vertically, but is cropped horizontally. As indicated in the DVIML elements 165, the content author 11 may use the <columns> element in order to specify alternatives to provide for devices which are horizontally restricted. To do this, within each <columns> element, the content author 11 may specify one or more <segment> elements, each specifying a value which is the number of supported, or concatenated, columns. In processing such marked-up content, the system will pick the particular <segment> most suited for the requesting user device.

Free-Form Textual Content and DVIML Element <Area>

Content such as text is said to have the characteristic bi-axially free form because it can be displayed equally effectively on devices having an equally sized display area, even though the shape of the display area may differ from device to device. For example, a paragraph of text that fits into a display having an area of 100 units will fit equally well whether the display is square (e.g., 10×10) or rectangular (e.g., 25×4). However, if user terminal devices differ in display size area, the number of characters sent to the particular terminal device is limited based on available area. As the DVIML elements 163 indicates, the content author 11 may use the <area> element in order to specify alternatives to provide for devices which differ in display area. Within the <area> element, the content author 11 can specify one or more <segment> elements, each specifying a character count. The network communication system 10 will then select the segment whose character count accords with the display size of the requesting user device. Here again, as with rows and columns, the content author 11 may use concatenation of segments in order to avoid repeating the same content in different segments. It can be seen that specifying a high character count has the effect of setting a low priority for that segment of text in that it will not be displayed on user terminal devices having smaller display areas.

Authored Content Display

Figure 12:
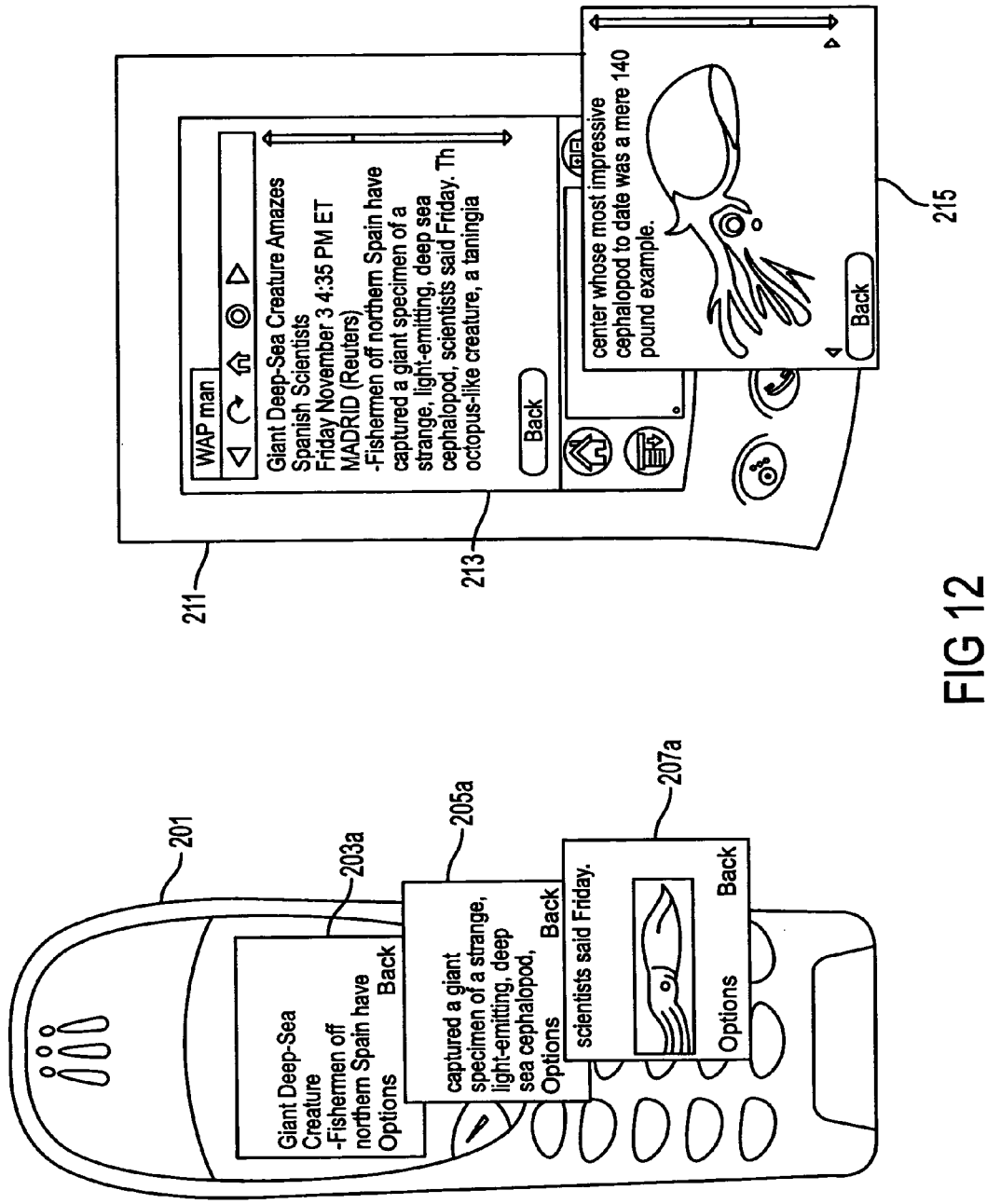
FIG. 12 illustrates the display produced by the code of FIG. 4 on a device with brief content and a small image and on a device with a detailed content and a large image.

FIG. 12 shows a user network terminal device 201, such as a mobile telephone, having a portrait display screen. When the content request 27 is made by the user network terminal device 201, the terminal device detector 21 receives the request 27 and identifies the user network terminal device 201 as a Nokia 6210, for example. The corresponding device feature values for a Nokia 6210 are obtained from the device profiles repository 23 and provided to the DVI transformer 25. The content repository 15 provides the device-independent content 43 to the origin server 51, such as the content exemplified by the code of FIG. 4 above, for example. The DVI transformer 25 converts the device-independent content 43 into device-specific content 29 for a Nokia 6210. In the resulting display, the device-specific content 29 is formatted into a first screen 203a showing an initial portion of text, a second screen 205a showing a subsequent portion of text, and a third screen 207a showing a small graphic image, for example, where individual screens are accessed by scrolling.

In comparison, when the content request 27 is made by a user network terminal device 211, such as a mobile hand-held computing device with a relatively large screen, the resulting display will differ from that provided by the user network terminal device 201. The terminal device detector 21 receives the request 27 and identifies the user network terminal device 211 as a Palm Vx, for example. The corresponding device feature values for a Palm Vx are obtained from the device profiles repository 23 and provided to the DVI transformer

25. The content repository provides the code of FIG. 4 above, and the DVI transformer 25 converts the device-independent content 43 into device-specific content 29 for a Palm Vx. In the resulting display, the device-specific content 29 is formatted into a detailed screen 213 and can display a larger image 215 in comparison to the screens 203-207 of the user network terminal device 201.

Figure 14:
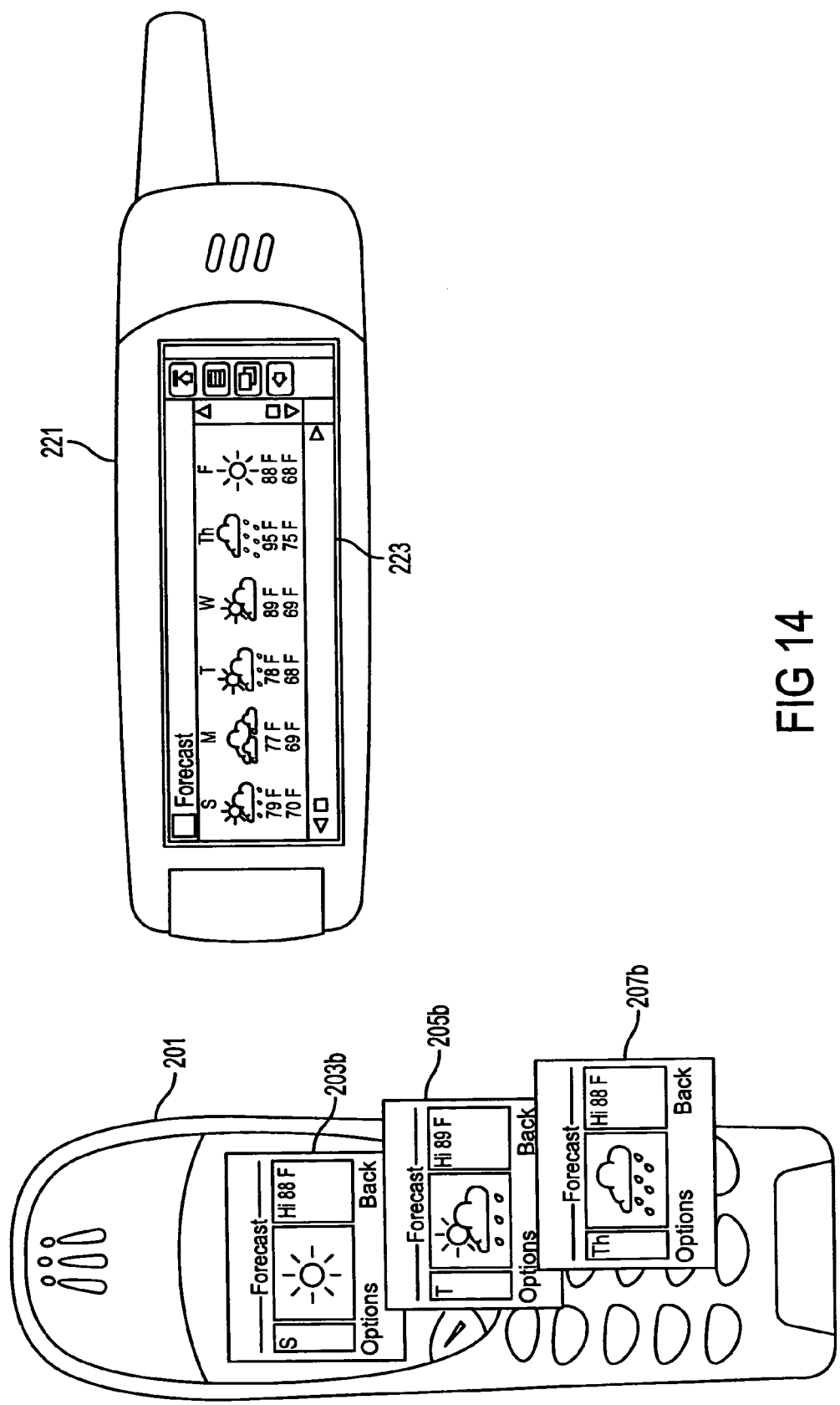
FIG. 14 illustrates the display produced by the code of FIG. 13 on a device with a portrait table and scrolling and on a device with a landscape table using a screen.

In another example, authored content for a weather report, exemplified by the markup code of FIG. 13, is provided to the DVI transformer 25 as the device independent content 43 for the user network terminal device 201, shown in FIG. 14. In the resulting display, the device-specific content 29 is formatted into a first screen 203b showing the forecast for the initial part of the week, a second screen 205b showing the forecast for the middle of the week, and a third screen 207b showing the forecast for the latter part of the week, for example, where individual screens are accessed by scrolling.

In comparison, when the content request 27 is made by a user network terminal device 221, such as a mobile telephone having a landscape display screen, the resulting display will differ from that provided by the user network terminal device 201. In the example provided, the device detector 21 identifies the user network terminal device 221 as an Ericsson R380, for example. In the resulting display, the device-specific content 29 is formatted into a detailed landscape screen 223 which can display the entire week's weather forecast.

Generic Terminal Device

Figures 15, 16:
FIG. 15 is an illustration of the concept of 'feature.
' FIG. 16 is an illustration of features having a plurality of values.

The concept of the generic terminal device 13 is described in greater detail with reference to FIG. 15 in which are shown a series of Greek letters $\alpha$, $\beta$, $\chi$, and $\delta$ representing variables, or features. The generic terminal device 13 can be defined in terms of device features having one or more values, much as a mathematical function term can be a function of variables with discrete values. In this example, the English equivalent letter a is written in different fonts to represent the different possible values for the feature a, the English equivalent letter b is written in different fonts to represent values for the feature $\beta$, and so on, in FIG. 16.

Figure 17:
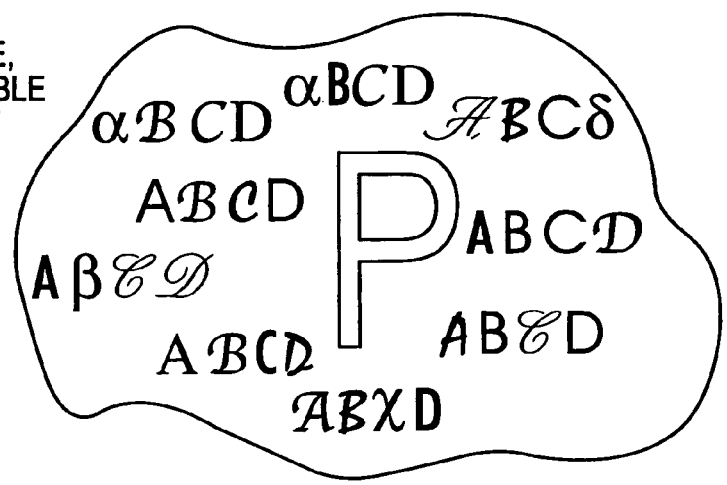
FIG. 17 is an illustration of a feature value set.
Figure 18:
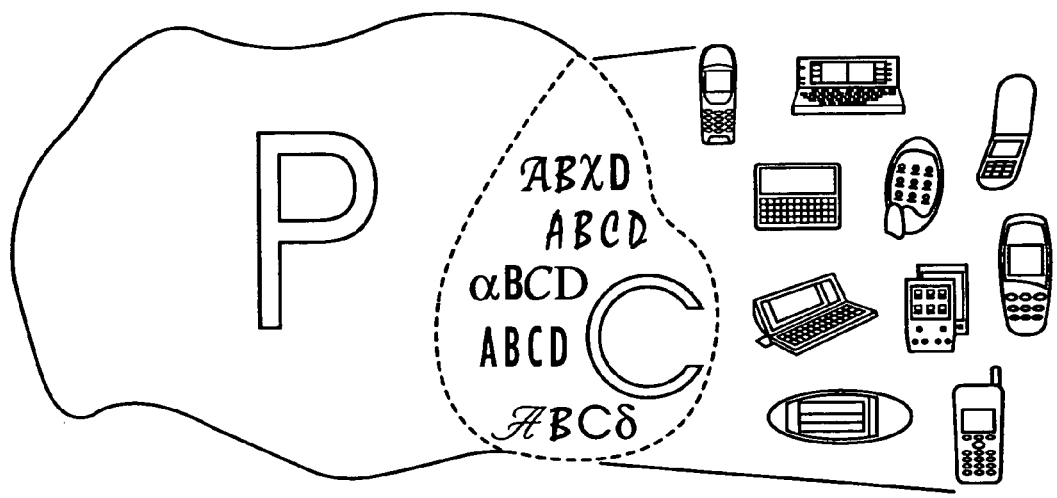
FIG. 18 is an illustration of the relationship of entire device space to available instances.

The space of all possible instances is described by the feature set $\{P\}$ along with the corresponding values of the features, where all possible combinations of values exist, as represented in FIG. 17. FIG. 18 illustrates the relationship between the entire device space, represented by the feature set $\{P\}$, and the range of available devices, represented by a currently-available set $\{C\}$, where $\{C\}$ is a subset of $\{P\}$. When a new feature is introduced, or evolves, represented by $\epsilon$ in FIG. 19, the feature set $\{P\}$ is increased accordingly. Because old features are not deleted from the feature set $\{P\}$, the disclosed method is backwardly compatible with earlier systems.

Figure 21:
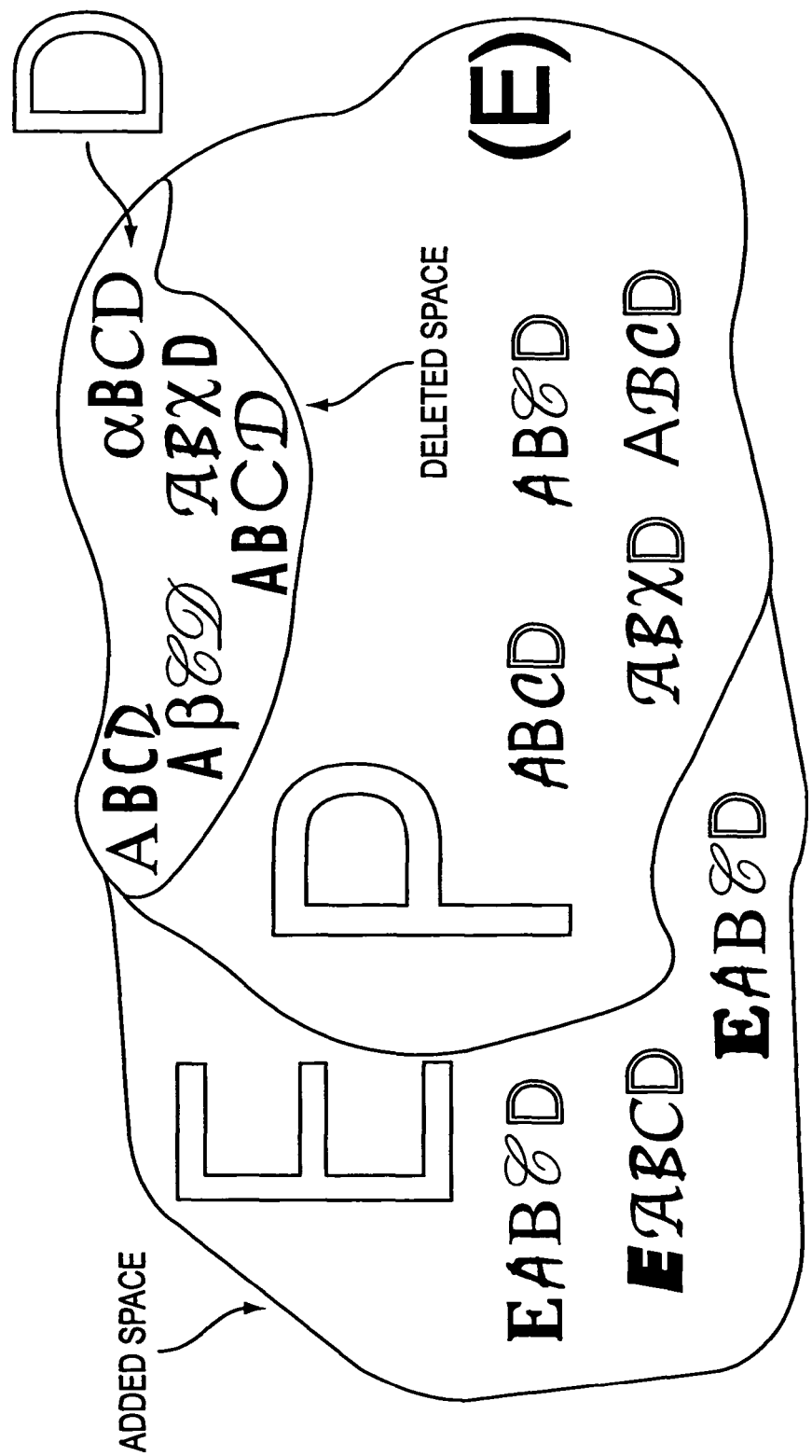

In FIG. 20, even though an old feature, represented by d, has stopped evolving and has acquired a constant value of D, the feature is not deleted from the feature set $\{P\}$. Thus, old content and processors remain valid, even they now have limited functionality in comparison to the new content and processor. As new features are added to the original feature set $\{P\}$, the set expands to include the region indicated by E in FIG. 21.

A judicious identification of the evolving feature $\epsilon$ can determine whether to include $\epsilon$ as a new feature. The process of feature evolution may occur when the features take on new values, when different combinations of different feature-values are instantiated, when new features are introduced, or when old feature values converge to a constant value. By a judicious identification of features, evolving changes can be covered without the need for their introduction as new features. This in turn, means that the content author will not need to modify his production methods to support new products of the evolving process. When new features are introduced, the feature set $\{P\}$ will need to be augmented, but will remain fully backwardly compatible.

The generic terminal device is a device which itself morphs or changes. For example, the generic terminal device can have a color capability feature which can take values of black and white, or color. The display screen size of the generic terminal device can be a small size, a medium size, or a large size. As the generic terminal device has values for features, and the values can change, the generic terminal device can represent all and more real terminal devices and is a superset of all possible terminal devices.

All features whose values change on the communication device may not be included in the feature set $\{P\}$. If no developer participation is required to modify content to utilize a feature or to maintain fidelity, then that feature is not included in the feature set $\{P\}$. In other words, features which can be accommodated in an automatic manner are ignored in the published feature set $\{P\}$, simplifying the set that the content author has to address.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method comprising:
  receiving device-independent content comprising markup information identifying one or more device feature values associated with the device-independent content, wherein the device-independent content is responsive to a content request from a device;
  identifying one or more device feature values associated with the device;
  matching at least one of the device feature values associated with the device-independent content with at least one of the device features values associated with the device;
  based, at least in part, on the matching, determining to convert the device-independent content into device-specific content adapted to the device; and
  determining to provide the device-specific content to the device.

2. The method of claim 1, further comprising:
  specifying a feature-value set for a plurality of devices, the feature-value set including a set of selected device features with one or more discrete feature values assigned to each of the selected device features, wherein each of the selected device features is selected from the features of the plurality of devices in accordance with a pre-established criterion.

3. The method of claim 2, wherein the set of selected device features comprises either display size, aspect ratio, display line count, color capability, graphics capability, variable size text capability, different font capability, input capability, input bandwidth, or a combination thereof.

4. The method of claim 2, wherein the pre-established criterion includes a determination that a particular selected device feature affects the manner in which the authored content is presented.

5. The method of claim 2, wherein the feature value set comprises discrete values assigned to selected features of a generic device.

6. The method of claim 5, wherein the generic device comprises a set of device features selected from the display features of the plurality of devices.

7. The method of claim 1, wherein the determination to convert the device-independent content comprises:
identifying a metatag section of the markup information corresponding to the device feature values associated with the device.

8. The method of claim 1, wherein the determination to convert the device-independent content comprises:
determining to remove the markup information from the device-independent content.

9. The method of claim 1, further comprising:
analyzing the device-independent content; and
determining to embed meta-data into the device-independent content, the meta-data comprising device feature values based, at least in part, on the device-independent content.

10. The method of claim 1, wherein the requesting device comprises at least one of a wireless telephone and a personal digital assistant.

11. The method of claim 1, further comprising:
identifying the requesting device prior to identifying one or more of the device feature values associated with the device.

12. The method of claim 11, wherein identifying the requesting device comprises reading device information contained in the request.

13. The method of claim 1, wherein the determination to convert the device-independent content comprises:
determining an array of display pixels available in the requesting device based, at least in part, on the device feature values associated with the device;
comparing the array of display pixels with an array of image pixels corresponding to an image in the device-independent content;
selecting the image for display in the requesting device if the array of image pixels does not exceed the array of display pixels; and
determining to suppress said image from display if the array of image pixels does exceed the array of display pixels.

14. The method of claim 1, wherein the determination to convert the device-independent content comprises:
determining an aspect ratio for the requesting device from the device feature values associated with the device;
determining to send content marked with an attribute of square to the requesting device if the aspect ratio is square;
determining to send content marked with an attribute of portrait to the requesting device if the aspect ratio is portrait; and
determining to send content marked with an attribute of landscape to the requesting device if the aspect ratio is landscape.

15. The method of claim 1, wherein the determination to convert the device-independent content comprises:
determining that the device-independent content is marked as having a uni-axis free form characteristic;
identifying the number of segments supported by the display in the requesting device;
concatenating a number of rows for sending to the requesting device if the uni-axis free form characteristic includes a list characteristic, wherein the number of rows corresponds to the number of segments supported; and
concatenating a number of columns for sending to the requesting device if the uni-axis free form characteristic includes a column characteristic, wherein the number of columns corresponds to the number of segments supported.

16. The method of claim 1, wherein determination to convert the device-independent content comprises:
determining that the device-independent content is marked as having bi-axially free form characteristic;
identifying the character count supported by a display in the requesting device;
determining to send to the requesting device a segment of content, wherein the character count in the segment corresponds to the character count supported by the display.

17. The method of claim 1, wherein the markup information comprises a first metatag identifying a first value for a first device feature and a second metatag identifying a second different value for the first device feature.

18. The method of claim 17, wherein the first metatag is associated with a first portion of requested content and the second metatag is associated with a related second portion of requested content, and wherein only one of the first portion and the second portion is included in the device-specific content.

19. The method of claim 1, wherein the one or more device feature values correspond to physical characteristics of the device.

20. The method of claim 1, wherein the matching comprises accessing a device profile repository including feature-value data for a plurality of different types of devices.

21. A system, comprising:
a device detector configured to receive a content request from a device and to determine therefrom one or more device feature values associated with the requesting device;
an origin server configured to receive the content request and, in response thereto, to provide device-independent content corresponding to the content request, wherein the device-independent content comprises markup information identifying one or more device feature values associated with the device-independent content;
a transformer configured to receive the device-independent content from the origin server, to associate at least one of the device feature values associated with the device-independent content with at least one of the device features values associated with the device, and to transform the device-independent content into device-specific content formatted for the requesting device.

22. The system of claim 21, further comprising a device profile repository accessible by the device detector, the device profile repository including a feature-value set for the requesting device, the feature-value set including a set of selected device features with one or more discrete device feature values assigned to each of the selected device features.

23. The system of claim 21, further comprising a content repository accessible by the origin server, the content repository for storing annotated authored content whereby the origin server provides device-independent content from the annotated authored content.

24. The system of claim 21, wherein the at least one device feature value is selected from the features of the requesting device in accordance with a pre-established criterion.

25. The system of claim 21, wherein the set of device feature values associated with the requesting device comprises a member of the group consisting of display size, aspect ratio, display line count, color capability, graphics capability, variable size text capability, different font capability, and input capability.

26. The system of claim 21, wherein the requesting device comprises at least one of a wireless telephone and a personal digital assistant.

27. A non-transitory computer-readable storage medium carrying one or more sequences of one or more instructions which, when executed by one or more processors, cause an apparatus to at least perform the following steps:
receiving a request for content from a device;
based, at least in part, on the request, identifying one or more device display characteristics associated with the device;
receiving content responsive to the request, wherein the content comprises markup information identifying one or more content display characteristics, the content display characteristics expressing an author intent for displaying the content on a plurality of devices having different display characteristics;
matching one or more device display characteristics with one or more content display characteristics;
based, at least in part, on the matching, determining to convert the content into a device-dependent format compatible with one or more device display characteristics of the device; and
determining to transmit the device-dependent formatted content to the device.

28. The non-transitory computer-readable storage medium of claim 27, wherein the step of determining to convert comprises:
determining to convert the content by interpreting metatags embedded in the content.

29. The non-transitory computer-readable storage medium of claim 27, wherein the step of determining to convert comprises:
determining to convert the content into a landscape-formatted display format if the device has a landscape-formatted display; and
determining to convert the content into a portrait-formatted display format if the device has a portrait-formatted display.

30. The non-transitory computer-readable storage medium of claim 27, wherein the step of determining to convert comprises:
determining to convert the content into a first aspect ratio if the device has the first aspect ratio; and
determining to convert the content into a second aspect ratio if the device has the second aspect ratio.

31. The non-transitory computer-readable storage medium of claim 27, wherein the step of determining to convert comprises:
determining to convert the content into a small-sized image if the device accommodates only small-sized images, and
determining to convert the content into a large-sized image if the device accommodates large-sized images.

32. The non-transitory computer-readable storage medium of claim 27, wherein the apparatus is caused to further perform:
determining to annotate the content with meta-data to indicate the manner in which portions of the content should be represented on a plurality of different devices having incompatible display characteristics.

33. The non-transitory computer-readable storage medium of claim 27, wherein determining to convert comprises:
determining to perform a best-fit match between the device display characteristics and one of a plurality of display formats.

34. A method comprising:
receiving a request for content from a device;
identifying one or more display feature values associated with the requesting device;
receiving device-independent content responsive to the request for content, the device-independent content comprising embedded annotations specifying author intent for displaying the content on a plurality of devices having different display characteristics, the embedded annotations including one or more content display feature values;
matching one or more display feature values associated with the requesting device with one or more content display feature values in the embedded annotations in the device-independent content; and
determining to convert the device-independent content into device-specific content based, at least in part, on the matching, the device-specific content compatible with one or more display feature values associated with the requesting device.

35. The method of claim 34, wherein identifying comprises:
determining a device type of the requesting device, and looking up the one or more display feature values based, at least in part, on the device type.

36. The method of claim 34, wherein one of the one or more display feature values corresponds to a display size of the requesting device.

37. The method of claim 34, wherein one of the one or more display feature values corresponds to an aspect ratio of the requesting device.

38. The method of claim 34, wherein one of the one or more display feature values corresponds to a display line count of the requesting device.

39. The method of claim 34, wherein one of the one or more display feature values corresponds to a color capability of the requesting device.

40. The method of claim 34, wherein one of the one or more display feature values corresponds to a variable size text capability of the requesting device.

41. The method of claim 34, wherein one of the one or more display feature values corresponds to a multiple font capability of the requesting device.

42. The method of claim 34, wherein one of the one or more display feature values corresponds to an input capability of the requesting device.

43. The method of claim 34, wherein one of the one or more display feature values corresponds to an input bandwidth of the requesting device.

44. The method of claim 34, wherein the determination to convert comprises:
determining to remove the annotations from the device-independent content.

45. The method of claim 34, wherein the requesting device comprises a wireless telephone.

46. The method of claim 34, wherein the determination to convert comprises:
determining an array of display pixels available in the requesting device based, at least in part, on the one or more display feature values;
comparing the array of display pixels with an array of image pixels corresponding to a content image;

selecting the content image for display in the requesting device if the array of image pixels does not exceed the array of display pixels; and determining to suppress said content image from display if the array of image pixels does exceed the array of display pixels.

47. The method of claim 34, wherein the determination to convert comprises:

determining an aspect ratio for the requesting device based, at least in part, on the one or more display feature values; and determining to send device-specific content in the determined aspect ratio to the device.

48. The method of claim 47, wherein the aspect ratio comprises a square aspect ratio.

49. The method of claim 47, wherein the aspect ratio comprises a portrait aspect ratio.

50. The method of claim 47, wherein the aspect ratio comprises a landscape aspect ratio.

51. An apparatus comprising:

at least one processor; and at least one memory including computer program code for one or more programs, the at least one memory and the computer program code configured to, with the at least one processor, cause the apparatus to perform at least the following, receive device-independent content comprising markup information identifying one or more device feature values associated with the device-independent content, wherein the device-independent content is responsive to a content request from a device;

identify one or more device feature values associated with the device;

match at least one of the device feature values associated with the device-independent content with at least one of the device features values associated with the device;

based, at least in part, on the matching, determine to convert the device-independent content into device-specific content adapted to the device; and determine to provide the device-specific content to the device.

52. The apparatus of claim 51, wherein a plurality of the device feature values associated with the device each corresponds to either display size, aspect ratio, display line count, color capability, graphics capability, variable size text capability, different font capability, input capability, or a combination thereof.

53. The method of claim 51, wherein the matching comprises accessing a device profile repository including feature-value data for a plurality of different types of devices.

54. The method of claim 1, wherein the device is a network terminal device.

* * * * *